United States Patent [19]

Shiraishi et al.

[11] Patent Number: 5,270,279
[45] Date of Patent: Dec. 14, 1993

[54] PRODUCTION PROCESS OF FORMED ACTIVATED COKE FOR SOX AND NOX REMOVAL HAVING HIGH NOX-REMOVING ABILITY

[75] Inventors: Ikuo Shiraishi; Yasuhiko Ninagawa; Kazuhiko Tsuji, all of Fukuoka; Yoshihiro Matsufuji, Tokyo, all of Japan

[73] Assignee: Mitsui Mining Co., Ltd., Tokyo, Japan

[21] Appl. No.: 915,715
[22] PCT Filed: Dec. 16, 1991
[86] PCT No.: PCT/JP91/01715
§ 371 Date: Jul. 28, 1992
§ 102(e) Date: Jul. 28, 1992
[87] PCT Pub. No.: WO92/11202
PCT Pub. Date: Sep. 7, 1992

[30] Foreign Application Priority Data

Dec. 17, 1990 [JP] Japan .................. 2-411078

[51] Int. Cl.⁵ .............. C01B 31/10; C01B 17/60; B01J 20/20; B01D 53/34
[52] U.S. Cl. .............. 502/432; 423/239.1; 423/244.03; 95/129; 95/137
[58] Field of Search ......................... 502/432

[56] References Cited

U.S. PATENT DOCUMENTS

| | | | |
|---|---|---|---|
| 1,731,223 | 10/1929 | Brady | 423/244.01 |
| 2,992,065 | 7/1961 | Feustel et al. | 423/242.1 |
| 3,502,427 | 3/1970 | Johswich | 502/432 |
| 3,634,028 | 1/1972 | Hohne | 423/244.03 |
| 4,210,628 | 7/1980 | Ninomiya et al. | 423/239 |
| 4,492,771 | 1/1985 | Hasegawa et al. | 423/242.1 |

FOREIGN PATENT DOCUMENTS

| | | |
|---|---|---|
| 55-167022 | 12/1980 | Japan . |
| 56-45745 | 4/1981 | Japan . |
| 56-113341 | 9/1981 | Japan . |
| 58-122042 | 7/1983 | Japan . |
| 62-51885 | 11/1987 | Japan . |

Primary Examiner—Paul E. Konopka
Attorney, Agent, or Firm—Fisher, Christen & Sabol

[57] ABSTRACT

This invention relates to a production process of formed activated coke for SOx and NOx removal which is employed in treatment systems for various flue gases and the like.

The formed activated coke for SOx and NOx removal obtained in accordance with the process of this invention has excellent pressure resistance, abrasion resistance and impact strength and also superb SOx- and NOx-removing ability, so that the coke is suitable for use in moving-bed, SOx and NOx- removing systems.

The formed activated coke for SOx and NOx removal can of course show excellent SOx- and NOx-removing effects when employed in conventional SOx- and NOx-removing processes and, moreover, owing to its characteristic high NOx-removing ability, is suited for the removal of NOx from low-SOx flue gas of a fluidized-bed combustion boiler or cogeneration power plant.

According to the process of this invention, dried, formed activated coke prepared from coal as a raw material is reacted with $SO_3$ gas at 100°–300° C., followed by heat treatment at 300°–600° C. in an inert atmosphere.

6 Claims, No Drawings

PRODUCTION PROCESS OF FORMED ACTIVATED COKE FOR SOX AND NOX REMOVAL HAVING HIGH NOX-REMOVING ABILITY

DESCRIPTION

1. TECHNICAL FIELD

This invention relates to formed activated coke for SOx and NOx removal, and especially to a production process for formed activated coke for SOx and NOx removal which has a high NOx-removing ability, excellent pressure resistance, abrasion resistance and impact strength and, is in large-scale systems.

2. BACKGROUND ART

Known dry processes for removing NOx from flue gas are to decompose NOx by bringing it into contact with a metallic catalyst at high temperatures in the presence of ammonia or to decompose or adsorb NOx by causing flue gas to pass through a layer of a carbonaceous adsorbent such as activated granular carbon in the presence or absence of ammonia.

Among these processes, the process which makes use of the carbonaceous adsorbent is particularly preferred as a treatment process for a gas which also contains SOx, such as combustion flue gas, because the carbonaceous adsorbent also has excellent SOx-adsorbing ability.

These carbonaceous materials are, however, somewhat inferior in NOx-removing ability as compared to metallic catalysts. As a result, various attempts have been made to improve their NOx-removing ability.

For example, for further improving the NOx-removing ability of a carbonaceous material such as activated carbon, there are methods in which the NOx-removing ability is improved by making a carbonaceous material carry a metal such as Ti, Cr, V, Fe or Cu or by treating a carbonaceous material with an oxidizing solution such as nitric acid, sulfuric acid or hydrogen peroxide or with an oxidizing gas such as $O_2$, $O_3$, $SO_3$ or NO in the presence of water vapor to oxidize and reactivate the carbonaceous material (U.S. Pat. No. 4,210,628, etc.).

Activated carbon has heretofore been used as a carbonaceous adsorbent for SOx and NOx removal. A method different from the conventional use of activated carbon has been recently developed which was formed activated coke for SOx and NOx removal with excellent results, especially in SOx- and NOx-removing ability (Japanese Patent Publication No. 1885/1987, etc.).

The specific surface area of formed activated coke for SOx and NOx removal of this type is 30 $m^2/g$ or less, which is smaller than the specific surface area of activated carbon, and the pore distribution of the former is also different from that of the latter. Because of its high strength including high pressure resistance, abrasion resistance and impact strength, the formed activated coke for SOx and NOx removal is suited for use in the practice of a moving-bed or fluidized-bed process in an actual large-scale system while being repeatedly subjected to regeneration after adsorption. There is, however, an increasing demand for an improvement in the NOx-removing ability of above processed activated coke.

Treatment of formed activated coke for SOx and NOx removal by the process employed above for the improvement of the NOx-removing ability of activated carbon is, however, accompanied by the drawback that, where the coke is metal-bearing activated coke, the metal is converted to a sulfate by $SO_2$ gas also contained in flue gas and the NOx-removing ability gradually decreases. Further, the oxidizing and reactivating method which makes use of an oxidizing solution has difficulty effecting activation to the interiors of pores so that the oxidizing treatment has to be repeated to significantly improve the NOx-removing activity.

In the case of oxidation and activation by an oxidizing gas, on the other hand, it is observed that activation proceeds to the interiors of pores and the NOx-removing ability can be effectively improved. The strength of the resulting activated coke has, however, been reduced, which leads to the problem that it can no longer withstand repeated use in a SOx- and NOx-removing system of the moving bed type.

It has therefore been found necessary to develop a new treatment method, which is different from those applied to conventional activated carbon, in order to improve the NOx-removing ability of the formed activated coke for SOx and NOx removal as described above.

DISCLOSURE OF THE INVENTION

A first object of this invention is to overcome the above-described drawbacks of the conventional art and to provide an improved process for the production of formed activated coke for SOx and NOx removal which has high and excellent NOx-removing ability.

A second object this invention is to provide a process for the production of formed activated coke for SOx and NOx removal which has a high NOx-removing ability, which comprises charging a formed activated coke, which has been produced using coal as a raw material and has been dried in a reactor; as a first step, causing a gas, which has been diluted with an inert gas and contains 2–10 vol. percent of $SO_3$, to pass at a temperature not higher than 250° C. for at least 1 hour at an SV value of 3,000–6,000 $hr^{-1}$ through a layer of the activated coke so that $SO_3$ gas is adsorbed on the formed activated coke and is allowed to react with the formed activated coke to a certain extent; and, as a second-stage reaction, causing a gas, which has been diluted with an inert gas and contains 2–10 percent of $SO_3$, to pass at a temperature not higher than 300° C., preferably 100°–300° C., more preferably 150°–250° C. at an SV value of 100–1000 $hr^{-1}$ for 4 hours or longer so that the $SO_3$ is reacted, and then subjecting the formed activated carbon to a heat treatment at a temperature of 300°–600° C. in an inert atmosphere.

A third object of this invention is to provide a process for the production of formed activated coke for SOx and NOx removal which has a high NOx-removing ability, which comprises providing a reactor which has an upper chamber of a small volume disposed above a lower chamber of a large volume with a flow passage for formed activated coke interposed therebetween, feeding formed activated coke to the upper chamber and guiding the formed activated coke out of a system from the lower chamber by way of the flow passage, feeding an $SO_3$-containing gas first into the lower chamber to cause the gas to flow through a layer of the formed activated coke in the lower chamber as a cross-flow relative to the flow of the formed activated coke, and then causing the gas to flow through a layer of the formed activated coke in the upper chamber as a cross-flow relative to the flow of the formed activated coke, whereby $SO_3$ is reacted with the formed activated coke.

The processes of the present invention can efficiently produce formed activated coke for SOx and NOx removal which has excellent pressure resistance, abrasion resistance and impact strength, is in a practical sense usable in large-scale systems, has high NOx-removing ability and is not available by any conventional process.

BEST MODES FOR CARRYING OUT THE INVENTION

Formed activated coke employed as a raw material in the present invention means a porous carbonaceous material which has a specific surface area of 100–300 m$^2$/g and is obtained by adding a caking additive to crushed coal as a primary raw material and then forming and carbonizing the resultant mass to activate the mixture or by using semi-coke, which has been obtained by carbonizing coal, as a primary raw material, crushing the semi-coke, adding coal or the like and a caking additive as auxiliary raw materials to the crushed semi-coke, forming the resultant mixture and then carbonizing the so-formed mixture again to activate it.

To obtain high-performance from the formed activated coke for SOx and NOx removal, in particular, it is preferred to use formed activated coke which has been obtained by using semi-coke, which has been obtained by carbonizing coal, as a primary raw material, crushing the semi-coke, adding coal or the like and a caking additive as auxiliary raw materials to the crushed semi-coke, forming the resultant mixture and then carbonizing the so-formed mixture again to activate it.

Although no particular limitation is imposed on the shape of the formed activated coke, those having a pellet-like shape of 3–20 mm in diameter and 5–25 mm in length are preferred for use in SOx- and NOx-removing systems of the moving bed type.

In the carbonization step, pores are formed dye to the evaporation of volatile components and activation also proceeds to some extent by gas and water vapor given off, whereby the specific surface area increases to provide formed activated coke whose specific surface area is 100–150 m$^2$/g. Depending on the properties of an intended product, the activation step may be omitted upon production of the formed activated coke.

The process of the present invention will hereinafter be described in detail in the order of its steps.

Formed activated coke, which has been dried sufficiently to reduce its water content to 1 wt. percent or lower, is first charged as a raw material in a reactor. In a temperature range not higher than 300° C., dried SO$_3$-containing gas is caused to pass through the reactor so that the SO$_3$ is reacted with the formed activated coke.

If they are reacted quickly at this time, localized evolution of heat may take place, which leads to the potential danger that the reaction may proceed out of control. It is therefore preferable to react them in two stages as will be described next. First, as a first stage, a gas diluted with an inert gas and containing 2–10 vol. percent of SO$_3$ is caused to pass at a temperature not higher than 250° C. and a high SV value of 3000–6000 hr$^{-1}$ for 1 hour or longer through the layer of the formed activated coke, whereby SO$_3$ gas is adsorbed on the formed activated coke and is allowed to react to a certain extent. Next, as a second-stage reaction, a gas diluted with an inert gas and containing 2–10 vol. percent of SO$_3$ is caused to pass at a temperature of 300° C. or lower, preferably 100°–300° C., more preferably 150°–250° C. and an SV value of 100–1000 hr$^{-1}$ for 4 hours or longer so that the SO$_3$ gas is allowed to react.

If the SV value is smaller than 3000 hr$^{-1}$ in the first-stage reaction, extraordinary evolution of heat tends to occur. If the SV value exceeds 6000 hr$^{-1}$, on the other hand, less SO$_3$ is adsorbed so that the effect is reduced.

If the temperature is lower than 100° C. in the second-stage reaction, the reaction is so slow that a lot of time is required, and SO$_3$ is adsorbed too much on the formed activated coke so that the resulting formed activated coke for SOx and NOx removal has reduced strength. Such low temperatures are therefore not preferred.

On the other hand, temperatures higher than 300° C. lead to a very high reaction velocity so that the reaction proceeds only on the surface of the formed activated coke. If the reaction temperature is shorter than 4 hours, activation does not proceed sufficiently to the inside of the formed activated coke so that the NOx-removing ability cannot be improved effectively to any significant extent. Such high temperatures are therefore not preferred.

In the process of the present invention, it is necessary to use, as the formed activated coke as a raw material, one which has a water content not higher than 1 wt. percent and to react it with a dried SO$_3$-containing gas.

As the SO$_3$ gas, general SO$_3$ gas for industrial use can be used by diluting it as needed. A byproduced gas from one of various chemical processes such as a sulfuric acid production plant can also be used insofar as it does not contain water and other harmful substances which would adversely affect the properties of the formed activated coke.

If the content of water in the formed activated coke as a raw material or in the reaction gas becomes higher, the resulting product has lowered strength and, especially, is prone to breakage so that the grain size is reduced. Such high water contents are therefore not preferred.

The reaction between the formed activated coke and the SO$_3$ gas can be carried out by suitably combining a method and an apparatus, which are both employed for general solid-gas reactions.

The common practice is, for example, to pass an SO$_3$-containing gas through a reactor packed with formed activated coke and maintained at a suitable temperature. Continuous production is, however, feasible when a reactor which has an upper chamber of a small volume disposed above a lower chamber of a large volume with a flow passage for formed activated coke interposed therebetween is provided, Formed activated coke as a raw material is fed first to the upper chamber and then to the lower chamber through the flow passage, in other words, is caused to flow downwardly and is guided out of a system from the lower chamber, an SO$_3$-containing gas is introduced first into the lower chamber to cause the gas to flow through the lower chamber as a crossflow relative to the flow of the formed activated coke, and the gas passed through the lower chamber is next fed to the upper chamber to cause it to flow through the upper chamber as a crossflow relative to the flow of the formed activated coke. This is especially suitable as a process according to this invention.

According to this process, the upper chamber is designed small so that the residence time of the formed activated coke as the raw material in the upper chamber is relatively short and, moreover, the SO$_3$-containing gas whose SO$_3$ concentration has become lower as a result of the reaction with the formed activated coke in the lower chamber passes at a high SV value. It is therefore possible to suppress any abrupt reaction between the formed activated coke and $SO_3$, thereby making it possible to prevent a localized occurrence of hot spots. In the lower chamber, the formed activated coke with $SO_3$ adsorbed in the upper chamber remains for a relatively long time so that the forced activated coke is brought into contact with an $SO_3$-containing gas fed at a low SV value and which has a relatively high $SO_3$ concentration. Since this allows the reaction to proceed sufficiently, a uniform and high-performance product can be obtained.

In these reaction steps, the adsorption and desorption of $SO_3$ ($SO_3 + C \rightarrow SO_2 + C \ldots O$) repeatedly take place inside micropores in the surface of the formed activated coke whereby oxidation and activation of the formed activated coke proceed.

If water is contained in the formed activated coke or $SO_3$ gas, the $SO_3$ gas turns to fuming sulfuric acid inside the micropores of the formed activated coke and significantly reduces the strength of the formed activated coke. It is therefore necessary to sufficiently remove water in advance.

As the formed activated coke reacted with $SO_3$ still carries extra $SO_3$, the formed activated coke is heat-treated at 300°-600° C. under a stream of an inert gas such as nitrogen so as to desorb $SO_3$.

In the above heat treatment step, a reaction also takes place between the desorbed $SO_3$ gas and the formed activated coke so that the NOx-removing ability is improved further. A formed activated coke for SOx and NOx removal which is excellent in NOx-removing ability can therefore be obtained.

By the reaction with $SO_3$ gas, the quantity of oxygen-containing functional groups on the surface of the formed activated coke is increased.

Since these oxygen-containing functional groups significantly improve the ammonia-adsorbing capacity and NO-oxidizing activity of the formed activated coke, the NOx-reducing ability of the formed activated coke is improved considerably.

The formed activated coke for SOx and NOx removal obtained by the process of this invention has a specific surface area of 120-350 m²/g and possesses high strength and excellent SOx- and NOx-removing ability. It is therefore suitable for use in SOx- and NOx-removing systems of the moving bed type. In particular, those obtained by conducting the reaction at 150°-250° C., the preferred temperature range, have excellent abilities in that their strength as measured by the measuring method to be described subsequently is 95 percent or higher and their SOx removal efficiency and NOx removal efficiency as measured under the measuring conditions to be set forth later are both 80 percent or higher.

The formed activated coke for SOx and NOx removal can of course show excellent SOx- and NOx-removing effects when employed in a conventional SOx- and NOx-removing process and, due especially to its feature of high NOx-removing ability, is also suited for the removal of NOx from flue gas of a fluidized-bed combustion boiler or a cogeneration power plant, since flue gas contains less SOx, thereby making it possible to reduce the size of the system.

EXAMPLES

The process of the present invention will hereinafter be described more specifically by the following examples, in which the measurements of the strength, SOx removal efficiency and NOx removal efficiency of each formed activated coke for SOx and NOx removal were conducted in accordance with the following methods, respectively. [Strength]

The strength of each sample was measured using a Roga index tester employed in JIS M8801. Twenty grams of the sample were placed in a drum which had 30 mm wide baffle plates secured vertically in a symmetrical relationship at two places on the inner wall thereof and was 200 mm in inner diameter and 70 mm in depth. After the drum was rotated 1,000 times in the course of 20 minutes, the sample was sifted through a 6 mm sieve and the weight of the sample remaining on the sieve was measured. The strength of the sample was measured in accordance with the following equation:

Strength (%) = Amount remaining in 6 mm sieve (g) ÷

20 (g) × 100

[$SO_x$-removing ability]

Each sample was packed to the height of 125 mm in a glass cylinder having an inner diameter of 55 mm. A gas consisting of 1,000 ppm of $SO_2$, 5% of $O_2$, 7% of $H_2O$ and the balance of $N_2$ was caused to pass at 140° C. and SV=400 hr$^{-1}$ through the glass cylinder to determine the $SO_2$ removing efficiency.

$NO_x$-removing ability

Each sample was packed to the height of 125 mm in a glass cylinder having an inner diameter of 55 mm. A gas consisting of 200 ppm of NO, 200 ppm of $NH_3$, 5% of $O_2$, 7% of $H_2O$ and the balance of $N_2$ was caused to pass at 140 C and SV=400 hr$^{-1}$ through the glass cylinder to determine the NO removing efficiency.

EXAMPLES

Semi-coke which had been obtained by carbonizing coal was crushed, to which caking coal and a caking additive were added. The resulting mass was formed into a pellet-like shape to provide a forming raw material. The forming raw material was carbonized and activated into formed activated coke whose diameter, length, specific surface area and strength were about 10 mm, about 10-20 mm, about 170 m²/g and 96%, respectively. Using a fixed-bed flowing reactor, the formed activated coke was reacted with $SO_3$ gas under the conditions shown in Table 1.

The reaction product was next heated at 400° C. for 1 hour under a nitrogen gas stream so that the reaction product was subjected to heat treatment. The results are also given in Table 1.

From the results of Table 1, it is understood that the $SO_3$ treatment by the process of this invention can significantly improve the NOx-removing ability without reduction of the strength of formed activated coke but, in the examples in which water was caused to exist in activated coke or $SO_3$ gas, the resultant products were substantially reduced in strength and only those unsuitable as formed activated coke for SOx and NOx removal were obtained.

TABLE 1

| No. | Water Content of AC* (%) | Reaction (1st stage/2nd stage) | | | | | Product | | | |
|---|---|---|---|---|---|---|---|---|---|---|
| | | $SO_3$ Concentration (%) | Water Content (%) | SV (hr$^{-1}$) | Temperature (°C.) | Time (hr) | Specific surface area (m$^2$/g) | Strength (%) | $SO_x$ removal efficiency (%) | $NO_x$ removal efficiency (%) |
| | | | | Untreated | | | 170 | 96 | 78 | 45 |
| 1 | 0 | 5/5 | 0/0 | 3000/300 | 200/200 | 1/10 | 200 | 96 | 85 | 82 |
| | 0.7 | 5/5 | 0/0 | 3000/300 | 200/200 | 1/10 | 200 | 96 | 80 | 82 |
| | 1.5 | 5/5 | 0/0 | 3000/300 | 200/200 | 1/10 | 200 | 88 | 80 | 82 |
| | 6 | 5/5 | 0/0 | 3000/300 | 200/200 | 1/10 | 180 | 64 | 80 | 78 |
| 2 | 0 | 5/5 | 0/0 | 3000/300 | 200/200 | 1/10 | 200 | 96 | 85 | 82 |
| | 0 | 5/5 | 2/2 | 3000/300 | 200/200 | 1/10 | 180 | 57 | 80 | 75 |
| 3 | 0 | 5/5 | 0/0 | 3000/300 | 25/25 | 1/10 | 210 | 80 | 88 | 70 |
| | 0 | 5/5 | 0/0 | 3000/300 | 120/120 | 1/10 | 200 | 88 | 85 | 76 |
| | 0 | 5/5 | 0/0 | 3000/300 | 150/150 | 1/10 | 200 | 96 | 85 | 80 |
| | 0 | 5/5 | 0/0 | 3000/300 | 200/200 | 1/10 | 200 | 96 | 85 | 82 |
| | 0 | 5/5 | 0/0 | 3000/300 | 250/250 | 1/10 | 200 | 96 | 85 | 82 |
| | 0 | 5/5 | 0/0 | 3000/300 | 300/300 | 1/10 | 210 | 96 | 88 | 72 |

*AC: Formed activated coke

INDUSTRIAL APPLICABILITY

The process of the present invention can efficiently produce formed activated coke for SOx and NOx removal, which has excellent pressure resistance, abrasion resistance and impact strength, is in a practical sense usable in large-scale systems, has high NOx-removing ability and is not available by any conventional process. The process of the present invention therefore has significant industrial utility.

The formed activated coke for SOx and NOx removal obtained in accordance with the process of this invention has high strength and excellent SOx- and NOx-removing ability and, therefore, is suitable for use in moving-bed, SOx- and NOx-removing systems.

The formed activated coke for SOx and NOx removal can of course show excellent SOx- and NOx-removing effects when employed in conventional SOx- and NOx-removing, processes and, moreover, due to its characteristically high NOx-removing ability, is suited for the removal of NOx from flue gas of a fluidized-bed combustion boiler or cogeneration power plant. As the size of a SOx- and NOx-removing system which makes use of a carbon material as a catalyst or an adsorbent is primarily governed by the NOx-removing ability of the carbon material, use of the formed activated coke for SOx and NOx removal produced in accordance with the process of this invention makes it possible to substantially reduce the size of the system.

We claim:

1. A process for the production of formed activated coke for SOx and NOx removal having high NOx-removing ability, which comprises: (a) placing formed activated coke, which has been prepared using coal as a raw material and has then been dried, in a reactor; (b) causing, as a first stage, a gas, which has been diluted with an inert gas and contains 2 to 10 vol.% of $SO_3$, to pass at a temperature of 100° to 300° C. and an SV value of 3,000 to 6,000 hr$^{-1}$ through the reactor for at least one hour, whereby $SO_3$ gas is absorbed on the formed activated coke and is allowed to partially react with the formed activated coke; (c) causing, as a second stage, a gas, which has been diluted with an inert gas and contains 2 to 10 vol.% of $SO_3$, to pass at a temperature of 100° to 300° C. and an SV value of 100 to 1,000 hr$^{-1}$ through the reactor for at least four hours, whereby $SO_3$ gas is allowed to react with the formed activated coke; and (d) then subjecting the reaction product to heat treatment and 300° to 600° C. in an inert atmosphere.

2. The process according to claim 1 wherein the formed activated coke is a porous carbon material having a specific surface area of 100 to 300 m$^2$/g, said porous carbon material having been obtained by using, as a primary raw material, semi-coke formed from coal by carbonization, crushing the semi-coke, adding as auxiliary raw material coal and a caking additive to the thus-crushed semi-coked, forming the resultant mass and then carbonizing and activating the thus-formed mass again.

3. The process according to claim 2 wherein the formed activated coke is in a pellet form having a diameter of 3 to 20 mm and a length of 5 to 25 mm.

4. A process for the production of formed activated coke for SOx and NOx removal having high NOx-removing ability, which comprises: (a) providing a reactor having an upper chamber of a small volume disposed above a lower chamber of a large volume with a flow passage for formed activated coke interposed therebetween; (b) feeding formed activated coke to the upper chamber and guiding the formed activated coke out of a system from the lower chamber by way of the flow passage; (c) feeding a 2 to 10 vol.% $SO_3$-containing gas first into the lower chamber to cause the gas to flow at a temperature of 100° to 300° C. and an SV value of 3,000 to 6,000 hr$^{-1}$ through a layer of the formed activated coke in the lower chamber as a crossflow relative to the flow of the formed activated coke; and (d) then causing the gas to flow at a temperature of 100° to 300° and an SV value of 100 to 1,000 hr$^{-1}$ through a layer of the formed activated coke in the upper chamber as a crossflow relative to the flow of the formed activated coke, whereby the $SO_3$ is reacted with the formed activated coke.

5. The process according to claim 4 wherein the formed activated coke is a porous carbon material having a specific surface area of 100 to 300 m$^2$/g, said porous carbon material having been obtained by using, as a primary raw material, semi-coke formed from coal by carbonization, crushing the semi-coke, adding as auxiliary raw material coal and a caking additive to the thus-crushed semi-coked, forming the resultant mass and then carbonizing and activating the thus-formed mass again.

6. The process according to claim 5 wherein the formed activated coke is in a pellet form having a diameter of 3 to 20 mm and a length of 5 to 25 mm.

* * * * *